3,062,658
DOUGH MAKING PROCESS

Duard W. Enoch, Kansas City, Mo., and Melvin M. Huber, Prairie Village, Kans., assignors to Interstate Bakeries Corporation, Kansas City, Mo., a corporation of Delaware
No Drawing. Filed Jan. 18, 1961, Ser. No. 83,393
6 Claims. (Cl. 99—90)

This invention relates to an improved dough-making process for bread and the like.

The principal ingredients of bread dough are flour, water, yeast, sugar, salt, and shortening. Milk solids are also included in most bread doughs, and certain secondary ingredients, such as yeast food and materials known collectively as dough conditioners or improvers are also generally used in small quantities.

Due to the complex nature of the physical characteristics and chemical behavior of the ingredients, especially the flour and yeast, what would appear to be minor changes in formulae or mixing procedures may result in substantial changes in the behavior of the mixtures and dough affecting bakery production costs and the ultimate baked product. While the results of changes in proportions of ingredients or mixing methods may be predicted to some extent by those skilled in the art, such predictions to be dependable must generally be based upon previous empirical experience. Thus, the search for ways and means for improving bread-making procedures and products is largely a cut-and-try program, anticipating unexpected results which may turn out to be either worthless or substantial improvement.

The baking industry is continuously seeking to produce better bread at lower cost. The principal object of the invention herein described is two-fold; viz., to provide a dough-making process which requires a relatively short time for completion and thus effect production economy, and to produce bread or the like having superior flavor, which flavor is maintained throughout the reasonable shelf life of the bread, and which has excellent keeping qualities.

Briefly, the improved method of the invention employs the preparation of a yeast brew in the nature of a well-started but incomplete ferment, which is then used in making up what may conveniently be termed a "pre-mix" containing all of the flour and water to be used in the dough, in addition to the ferment. This pre-mix mass is mixed to the point of full development of the gluten and allowed to set, after which the balance of the dough ingredients, including milk solids, salt, additional sugar and shortening and, if desired, additional yeast, are added to the pre-mix, and this dough mass is again mixed to optimum gluten condition, a short floor time provided, and the finished dough is then delivered to the loaf-forming and panning operation.

The improved dough-making method can best be described by means of a specific example. In a preferred process, the following ingredients are placed in a suitable container (all quantities being expressed in pounds unless otherwise noted):

Water _____ 10
Yeast _____ 3
Yeast food _____ ½
Sugar _____ 2

The temperature of the brew should be about 85° F., and the mixture is stirred sufficiently to break up the yeast and dissolve the sugar. This brew is permitted to stand and ferment for a period of from three to ten minutes.

It is then ready for use in making up the dough pre-mix, which includes the following ingredients:

Flour _____ 100
Water _____ 61
Oxidizer _____p.p.m__ 0–10
Ferment _____ 15½

The temperature of this pre-mix mass should be about 80° F. This mixture is conveniently made up in the bowl of a large vertical dough mixer and, after the listed ingredients have been brought together in the bowl, the mass is mixed to the point of full gluten development, requiring approximately 2 to 2½ minutes in a high-speed mixing machine. The bowl is then removed from the machine, and the pre-mix mass given set time of from 1 to 1½ hours.

Preparatory to a final mixing of the total ingredients of the dough, the following ingredients are added to the pre-mix mass in the mixing bowl:

Milk solids _____ 4
Salt _____ 2¼
Shortening _____ 3
Sugar _____ 6

An additional pound or so of yeast may also be added at this stage, if desired. This final dough mixture is again placed in the mixing machine and again mixed to the point of full gluten development. Floor time of from 20 to 30 minutes is then given to this final dough mass. It is then ready for delivery to the loaf-forming machinery for dividing, rounding, overhead proofing, moulding, panning, pan-proofing, and baking.

The following explanation of significant considerations involved in the process of the invention is included in this specification to promote a clear understanding of the invention. While it is believed that these considerations are sound, the invention is not intended to be limited by reason of these views.

The preliminary preparation of the brew provides an opportunity for fermentation to get under way and accelerate in activity prior to inter-mixing with the flour and thus before the dough batch preparation is initiated. The ferment appears to "trigger" the yeast action in the pre-mix and in the ultimate dough. With the preliminary fermentation time and effect added to the fermentation of the flour compositions, fermentation is permitted to proceed to the point at which relatively copious amounts of flavor-imparting fermentation products are produced, accounting, apparently, for the improved flavor of the bread product. All of the flour and all of the water (including that in the ferment) are used in the pre-mix, and this mass is mixed and worked to the point of full development of the gluten to promote rapid and complete hydration of the flour. Full expansion of the gluten during fermentation of the pre-mix mass during the set time following this first mixing operation is expedited by the full development of the gluten achieved by the mixing, especially as a consequence of the triggering action of the preliminary fermentation of the brew.

Incorporation of the oxidizer and/or other unmentioned additives in the pre-mix is optional.

It has been observed that the pre-mix does not have a tendency to "break short," as does the stiff sponge in the sponge-dough method of making dough, but rather expands rapidly, holding most of the gas produced by fermentation.

It is notable from the foregoing example that a small portion of the total sugar used in the dough is incorporated in the brew to feed the yeast, and the balance of the sugar is added at the time of the final mixing of the dough. Sugar is not added to the pre-mix because this would result in the sugar being more or less exhausted by fermentation. Also, sugar added at this stage tends to slacken the pre-mix, necessitating a longer mixing time. For the same reason, the shortening is not added to the pre-mix, since it tends to have a lubricating action and full development of the gluten would require a longer mixing period. It must be recognized, however, that the sugar and shortening may be incorporated in the pre-mix with some sacrifice in the speed of the process.

The salt and milk are not incorporated in the pre-mix because these ingredients tend to buffer and retard fermentation. As noted above, a small amount of yeast may be added to the dough prior to the final mixing to enhance expansion during the final floor time and proofing stages.

It will be understood that the advantages of the invention thus described reside in manufacturing improvements, due to the relatively short period of time (approximately one hour and 23 minutes to two hours and ten minutes) required for preparation of the dough, and improved bread products which possess superior flavor and excellent keeping qualities.

Invention is claimed as follows:

1. The method of making bread dough having a predetermined final dough composition which method comprises the following steps:

making a brew of water, yeast, yeast food and sugar at a temperature of about 85° F.;

permitting said brew to stand and preliminarily ferment for from about three to about ten minutes to form a ferment;

bringing together the ingredients of a dough pre-mix comprising said ferment and all of the flour and the balance of the water to be included in the final dough composition at a temperature of about 80° F.;

mixing said pre-mix in a dough mixing machine to the point of full gluten development;

permitting said pre-mix to set for from about one to about one and one-half hours;

adding milk solids, salt, shortening and additional sugar to said pre-mix to provide the final dough composition;

mixing said dough to the point of full gluten development, and permitting said dough to stand for from about twenty to about thirty minutes.

2. The method of claim 1 wherein the pre-mix and the final dough composition are mixed in high speed mixing machines.

3. The method of claim 1 wherein the water used in making the brew is approximately fourteen percent of the total amount of water used in the dough composition.

4. The method of claim 1 wherein the sugar used in making the brew is approximately one-fourth of the total amount of sugar used in the dough composition.

5. The method of claim 1 wherein additional yeast is added to the pre-mix when the milk, salt, shortening and sugar are added.

6. The method of making bread dough which method comprises the following steps:

making a brew consisting essentially of:

| | |
|---|---|
| water _____units by weight__ | 10 |
| yeast _____ | 3 |
| yeast food _____ | ½ |
| sugar _____ | 2 | at a temperature of about 85° F.;

permitting said brew to stand and preliminarily ferment for from about three to about ten minutes to form a ferment;

bringing together the ingredients of a dough pre-mix comprising:

| | |
|---|---|
| flour _____units by weight__ | 100 |
| water _____ | 61 |
| said ferment _____ | 15½ | at a temperature of about 80° F.;

mixing said pre-mix in a dough mixing machine to the point of full gluten development;

permitting said pre-mix to set for from about one to about one and one-half hours;

adding to said pre-mix:

| | |
|---|---|
| milk solids _____units by weight__ | 4 |
| salt _____ | 2¼ |
| shortening _____ | 3 |
| sugar _____ | 6 | to provide the final dough composition;

mixing said dough to the point of full gluten development, and permitting said dough to stand for from about twenty to about thirty minutes.

References Cited in the file of this patent

UNITED STATES PATENTS

| | | |
|---|---|---|
| 734,847 | Garrick _____ | July 28, 1903 |
| 904,573 | Temple _____ | Nov. 24, 1908 |

FOREIGN PATENTS

| | | |
|---|---|---|
| 790,733 | Great Britain _____ | Feb. 12, 1958 |